W. RUTHVEN.
GEARING FOR WASHING MACHINES.
APPLICATION FILED NOV. 9, 1908. RENEWED JULY 29, 1909.
935,553.  Patented Sept. 28, 1909.
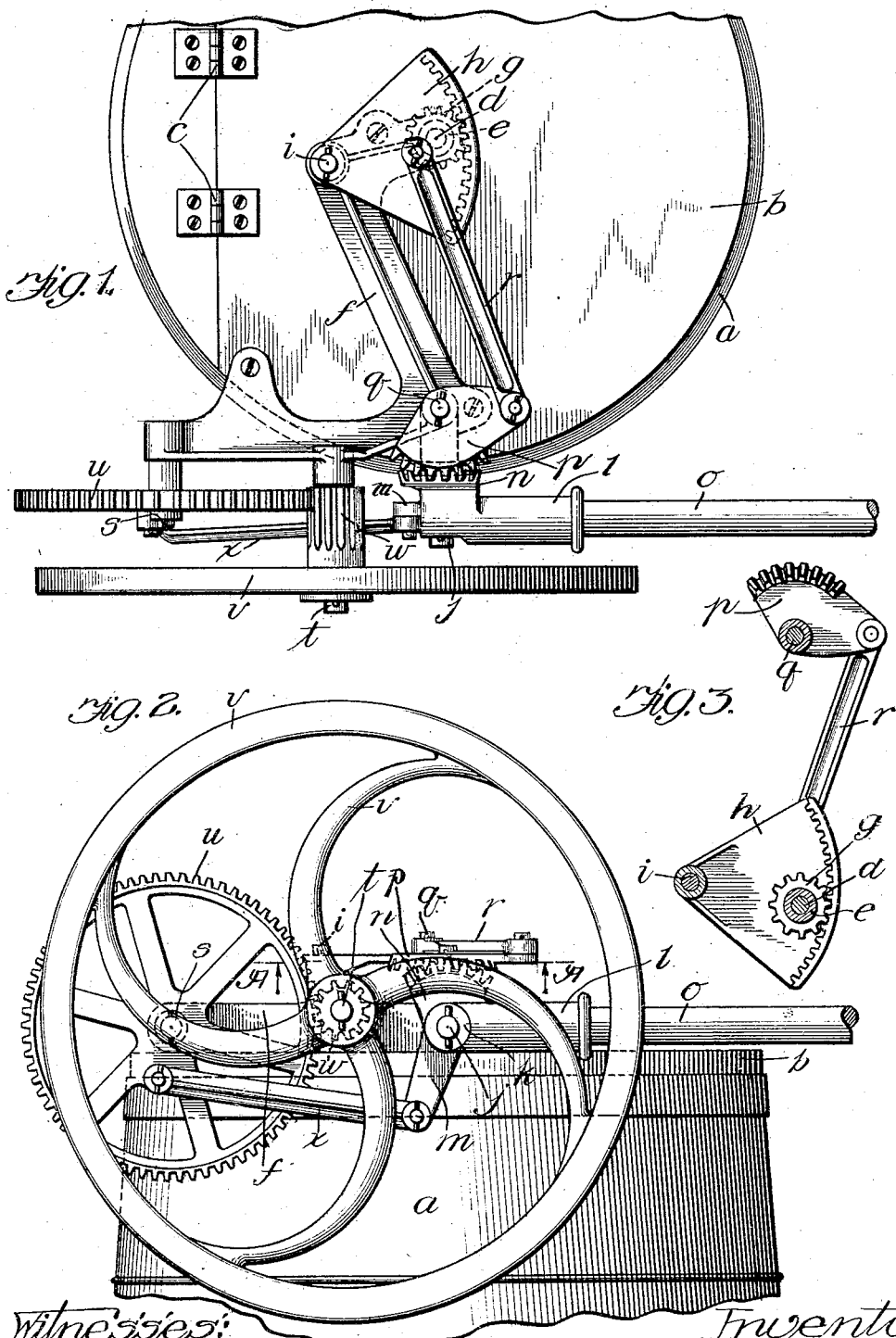

UNITED STATES PATENT OFFICE.

WILLIAM RUTHVEN, OF CHICAGO, ILLINOIS.

GEARING FOR WASHING-MACHINES.

935,553.  Specification of Letters Patent.  Patented Sept. 28, 1909.

Application filed November 9, 1908, Serial No. 461,604. Renewed July 29, 1909. Serial No. 510,273.

*To all whom it may concern:*

Be it known that I, WILLIAM RUTHVEN, a citizen of the United States, and a resident of Chicago, in the county of Cook and State of Illinois, have invented certain new and useful Improvements in Gearing for Washing-Machines, &c., of which the following is a full, clear, and exact specification.

My invention is concerned with a novel mechanism primarily designed for transforming the swinging movement of the operating lever of a washing machine into the reciprocating rotary movement of the stirrer or beater shaft and the continuous high-speed rotary movement of the fly wheel associated therewith to give evenness and ease of operation to such machines, despite the reciprocating movement of the main parts thereof.

To illustrate my invention, I annex hereto a sheet of drawings, in which the same reference characters are used to designate identical parts in all the figures, of which,—

Figure 1 is a top plan view of a machine embodying my invention in its preferred form; Fig. 2 is a side elevation of the same; and Fig. 3 is an inverted plan view of a portion of the gearing in section on the line A—A of Fig. 2.

My invention is adapted to be employed in connection with a tub $a$ of the ordinary construction, which is supported at a suitable height by legs, not shown, and which has the lid $b$ hinged thereto, as at $c$, and the entire gearing is carried by said lid, so that when it is raised, the gearing moves with it. The beater shaft $d$ is journaled in a suitable vertical bearing $e$ formed in the frame casting $f$, which may be of the generally Z-shape shown, and which is secured to the lid in any suitable manner, as by the screws or bolts shown. This beater shaft $d$ has rigidly secured on its upper end the spur pinion $g$, which is engaged by the inwardly-projecting teeth of the spur gear segment $h$, which is journaled on the bearing stud $i$ projecting upward from one of the corners of the frame casting. The frame casting has at another corner the horizontal bearing stud $j$, upon which is fulcrumed the lever socket casting which is made up of the central bearing portion $k$, the socket portion $l$, the arm portion $m$, and the bevel gear segment portion $n$. The handle $o$ is secured in the socket portion, and the teeth of the bevel segment portion $n$ mesh with the teeth of the bevel-gear crank-arm segment $p$, which is journaled on the vertical bearing stud $q$ projecting up from the frame casting. A pitman or link $r$ journaled upon eccentrically-mounted bearing pins on the two gear segments $h$ and $p$ serve to cause them to be swung in unison, so that the swinging movement applied to the hand lever $o$ will cause the stirrer shaft $d$ to be reciprocated back and forth through the greater arc that is desirable in the operation of these machines. The frame casting is also provided with the two bearing studs $s$ and $t$, upon which are journaled, respectively, the gear wheel $u$ and the fly wheel $v$, the latter preferably having the spur pinion $w$ meshing with the gear wheel $u$ rigidly secured to or formed integrally with its hub. The gear wheel $u$ and the arm $m$ of the operating lever are connected by the link or pitman $x$, which is pivoted on suitably located eccentric bearing studs or pins carried by the spur gear wheel and the arm, respectively.

The operation of the complete movement will be readily apparent, as the swinging of the operating lever, in addition to the reciprocation of the stirrer shaft, serves to rapidly rotate the fly wheel $v$ by reason of the multiplying gearing connections between it and the hand lever.

While I have shown and described my invention in the form which I at present consider best adapted to carry out its purposes, it will be understood that it is capable of modifications, and that I do not desire to be limited in the interpretation of the following claims, except as may be necessitated by the state of the prior art.

What I claim as new, and desire to secure by Letters Patent of the United States, is:

1. In a device of the class described, the combination with a stirrer shaft and a pinion carried thereby, of an operating lever, having a gear segment, a crank-arm segment meshing with the operating-lever segment, a segment meshing with the pinion, a link connecting the crank-arm segment and the pinion segment, a fly wheel, and connections between the operating lever and the fly wheel for rapidly rotating the latter.

2. In a device of the class described, the combination with a stirrer shaft and a pinion carried thereby, of an operating lever, having a gear segment and an arm, a crank-arm segment meshing with the operating-lever segment, a segment meshing with the pinion, a link connecting the crank-arm segment and the pinion segment, a fly wheel, and connections between the operating lever and the fly wheel for rapidly rotating the latter, said connections consisting of a gear wheel having an eccentric pin, a pitman pivoted to the arm and to the pin, and a pinion carried by the fly wheel and meshing with the gear wheel.

3. In a device of the class described, the combination with a stirrer shaft and a pinion carried thereby, of an operating lever, having a bevel-gear segment, a crank-arm bevel-gear segment meshing with the operating-lever segment, a segment meshing with the pinion, a link connecting the crank-arm segment and the pinion segment, a fly wheel, and connections between the operating lever and the fly wheel for rapidly rotating the latter.

4. In a device of the class described, the combination with a stirrer shaft and a pinion carried thereby, of an operating lever, having a bevel-gear segment, a bevel-gear crank-arm segment meshing with the operating-lever segment, an internally-toothed segment covering and meshing with the pinion, a link connecting the crank-arm segment and the pinion segment, a fly wheel, and connections between the operating lever and the fly wheel for rapidly rotating the latter.

5. In a device of the class described, the combination with a stirrer shaft and a pinion carried thereby, of an operating lever, having a bevel-gear segment and an arm, a bevel-gear crank-arm segment meshing with the operating-lever segment, an internally-toothed segment covering and meshing with the pinion, a link connecting the crank-arm segment and the pinion segment, a fly wheel, and connections between the operating lever and the fly wheel for rapidly rotating the latter, said connections consisting of a gear wheel having an eccentric pin, a pitman pivoted to the arm and to the pin, and a pinion carried by the fly wheel and meshing with the gear wheel.

6. In a device of the class described, the combination with a stirrer shaft and a pinion carried thereby, of a rocking element having a bevel gear segment and an arm, a crank-arm bevel gear-segment meshing with the rocking element segment, a segment meshing with the pinion, a link connecting the crank-arm segment and the pinion segment, a wheel, a pinion carried by the wheel, a gear wheel having an eccentric pin and meshing with the pinion carried by the wheel, a frame having a bearing aperture therein for the stirrer shaft, bearing studs carried by the frame for the crank-arm bevel gear-segment and the pinion segment, bearing studs likewise carried by the frame for the rocking element and the gear wheel and extending at right angles to the first-mentioned studs, and a pitman pivoted to the arm of the rocking element and to the eccentric pin.

In witness whereof, I have hereunto set my hand and affixed my seal, this 4th day of November, A. D. 1908.

WILLIAM RUTHVEN. [L. S.]

Witnesses:
JOHN HOWARD MCELROY,
F. E. BROM.